United States Patent
Ehrmann

(10) Patent No.: US 8,020,896 B2
(45) Date of Patent: Sep. 20, 2011

(54) HOSE CONNECTOR AND PORTABLE HANDHELD WORK APPARATUS

(75) Inventor: Andreas Ehrmann, Auenwald (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 451 days.

(21) Appl. No.: 12/213,433

(22) Filed: Jun. 19, 2008

(65) Prior Publication Data

US 2009/0001716 A1    Jan. 1, 2009

(30) Foreign Application Priority Data

Jun. 27, 2007    (DE) .................. 10 2007 029 617

(51) Int. Cl.
*F16L 5/00* (2006.01)
(52) U.S. Cl. ............. 285/136.1; 285/124.4; 285/239; 285/215
(58) Field of Classification Search ............. 285/124.4, 285/139.3, 140.1, 239, 215, 204, 136.1
See application file for complete search history.

(56) References Cited

U.S. PATENT DOCUMENTS

| | | | | |
|---|---|---|---|---|
| 3,512,806 A | * | 5/1970 | Fullmer et al. | 285/124.4 |
| 4,232,421 A | * | 11/1980 | Tucker | 285/140.1 |
| 4,687,235 A | * | 8/1987 | Stoll | 285/136.1 |
| 4,744,785 A | * | 5/1988 | Rosenthal et al. | 604/6.09 |
| 4,762,343 A | * | 8/1988 | Hirohata | 285/140.1 |
| 4,966,189 A | * | 10/1990 | Harris | 285/319 |
| 4,972,875 A | * | 11/1990 | Beer et al. | 285/239 |
| 5,692,783 A | * | 12/1997 | Watanabe et al. | 285/140.1 |
| 5,755,705 A | * | 5/1998 | Van Driel | 285/239 |
| 6,003,904 A | * | 12/1999 | Frohlich et al. | 285/124.1 |
| 6,505,866 B1 | * | 1/2003 | Nakamura et al. | 285/239 |
| 6,692,037 B1 | * | 2/2004 | Lin | 285/124.1 |
| 6,866,058 B1 | * | 3/2005 | Brock et al. | 137/202 |
| 7,472,929 B2 | * | 1/2009 | Fattorusso et al. | 285/239 |
| 7,690,362 B2 | * | 4/2010 | Pike et al. | 123/516 |

* cited by examiner

*Primary Examiner* — David E Bochna
(74) *Attorney, Agent, or Firm* — Walter Ottesen

(57) ABSTRACT

A hose connector (19, 59) for the assembly in a housing opening (13) of a tank of a portable handheld work apparatus is formed as one piece and has a base plate (20). A sealing rim (21) for mounting in the housing opening (13) is provided on the base plate (20) at a first side (57). The hose connector (19, 59) has at least one connecting channel (31, 32) which projects through the base plate (20) and which, at least at one end, has at least one connecting stub (24, 24', 25, 26, 26') for connecting to a hose line. A first connecting stub (26, 26') is fixed within the sealing rim (21) on the base plate (20) and has a pull-off protector (54). The pull-off protector (54) is at a distance (e) to the base plate (20) perpendicularly to the plane of the base plate (20) which is greater than the distance (f) of the lower edge (51) of the sealing rim (21) to the base plate (20). The lower edge (51) faces away from the base plate (20).

14 Claims, 4 Drawing Sheets

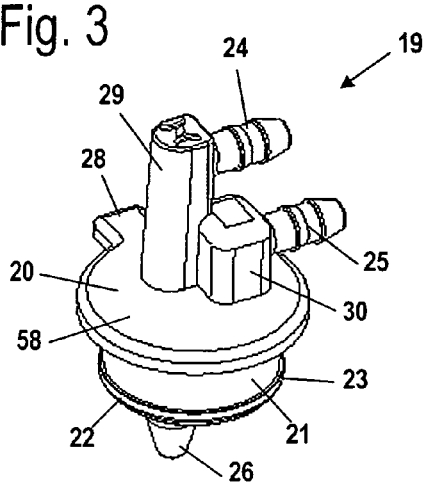

HOSE CONNECTOR AND PORTABLE HANDHELD WORK APPARATUS

CROSS REFERENCE TO RELATED APPLICATION

This application claims priority of German patent application no. 10 2007 029 617.9, filed Jun. 27, 2007, the entire content of which is incorporated herein by reference.

FIELD OF THE INVENTION

The invention relates to a hose connector and a portable handheld work apparatus having a hose connector.

BACKGROUND OF THE INVENTION

It is known to use hose connectors to connect hose lines. In handheld work apparatus, hose connectors are used, for example, at the fuel tank in order to connect a suction head, which is arranged in the fuel tank, to the carburetor of the drive motor of the work apparatus. The hose connector must ensure a good seal to the housing opening wherein the hose connector is mounted and, at the same time, it should ensure that the hose lines, which are connected to the hose connector, cannot be inadvertently pulled off. Hose connectors of this kind should be easily manufacturable. In order to make possible the manufacture in an injection molding process, known hose connectors have smooth connecting stubs onto which the hose lines are pushed.

SUMMARY OF THE INVENTION

It is an object of the invention to provide a hose connector which can be simply manufactured and manufactured as one piece and wherein an unintended pulling off of the hose lines from the connecting stubs is avoided. It is another object of the invention to provide a handheld work apparatus having a hose connector which can be easily manufactured.

The hose connector of the invention is for assembly in an opening of a housing. The hose connector includes: the hose connector being configured as a single piece and having a base plate; the base plate defining a plane and having first and second sides; a sealing rim disposed on the first side to accommodate mounting the hose connector in the opening; a connecting channel passing through the base plate and having an end defining a first connecting stub for connecting to a hose line; the first connecting stub being fixed on the base plate within the sealing rim; the first connecting stub having a pull-off protector formed thereon for the hose line; the pull-off protector being at a first distance (e) to the plane of the base plate measured perpendicularly to the plane; the sealing rim having a lower edge disposed at a second distance (f) from the base plate; and, the first distance (e) being greater than the second distance (f).

The connecting stub, which is fixed within the sealing rim on the base plate, has a pull-off protector in order to avoid an unwanted pulling off of the hose line. Pull-off protectors of this kind can, for example, be realized by a specific structure of the connecting stub, especially by risers. In order to make possible a manufacture of the hose connector with the pull-off protector in an injection-molding process, it is provided that the pull-off protector is at a distance to the base body perpendicular to the plane of the base plate with this distance being greater than the distance of the lower edge of the sealing rim to the base plate. The lower edge of the sealing rim faces away from the base plate. The distance of the lower edge of the sealing rim is then the greatest distance for an uneven running lower edge.

The pull-off protector is arranged below the sealing rim. For this reason, the pull-off protector can be formed during the injection-molding process via laterally movable cores. In this way, the manufacture of the hose connector is made possible in an injection-molding process.

At least one connecting stub is arranged advantageously on the second side of the base plate facing away from the sealing rim and this connecting stub has a pull-off protector. The sealing rim usually projects into the interior of the housing so that the first connecting stub likewise projects into the interior of the housing. The connecting stubs on the second side also have pull-off protectors, that is, usually on the housing outer side. For this reason, an unintended pulling off of a hose line arranged on this connecting stub is avoided. A simple configuration of the pull-off protector is achieved when the pull-off protector has at least one thickening which has a shoulder on the side which lies opposite to the pull-off direction of a hose line pushed onto the connecting stub. The shoulder is grabbed from behind by the pushed-on elastic hose line so that a form-tight fixation is given. To facilitate an easy push on of the hose line onto the connecting stub, the thickening has a section whose diameter increases in the direction toward the shoulder. The section can, for example, be configured to have a truncated conical shape. A further cylindrical section can be provided between the truncated conical section and the shoulder.

In order to also be able to manufacture the sealing rim of the hose connector in a simple manner, the first connecting stub has a pipe stub connected to the base plate. A section with reduced diameter is provided between the pipe stub and the pull-off protector and the diameter of the pipe stub corresponds at least to the largest diameter of the pull-off protector. To manufacture the hose connector, a core can be arranged in the interior of the sealing rim which can be pulled out in the longitudinal direction of the pipe stub. The reduced diameter makes possible the configuration of a shoulder on the pull-off protector of the first connecting stub. The diameter of the connecting stub corresponds to at least the largest diameter of the pull-off protector. For this reason, a core can be pushed in the longitudinal direction of the pipe stub over the pull-off protector. The section having the smallest diameter can be manufactured via laterally pullable cores.

Advantageously, at least two connecting stubs are provided on the second side of the base plate. The connecting stubs on the second side of the base plate are at a distance with respect to each other especially perpendicular to the base plate. The distance makes possible an alignment of the partition plane of mold halves of an injection casting form perpendicular to the plane of the base plate. In this way, pull-off protectors can be formed on both connecting stubs. The distance between the two connecting stubs can be small. The distance must only make possible a lateral pulling of the core of the injection casting mold of the hose connector.

Advantageously, at least one connecting stub, which is arranged on the second side of the base plate, is arranged on a pipe stub. The pipe stub is fixed on the base plate and the connecting stub is arranged laterally on the pipe stub so as to project therefrom. In this way, the direction, in which the connecting stub and therefore a hose line, which is pushed onto the connecting stub, are guided away, can be adapted well to the structural conditions. A bending or kinking of the hose lines when guiding the same away from the connecting stubs can thereby be avoided.

Advantageously, at least one connecting stub runs parallel to the base plate. Especially, at least two connecting stubs run parallel to each other. In that at least two connecting stubs run parallel to each other, the channels, which are formed in the connecting stubs, can be formed with a common core which is pulled in a common pull direction. Two connecting stubs, which are arranged on the second side of the base plate, are offset with respect to each other parallel to the plane of the base plate in order to achieve an adequate distance of the connecting stubs to each other with a small structural size of the hose connector so that the cores for manufacturing the hose connector can be easily produced. The offset furthermore improves the accessibility of the hose connecting stubs so that the assembly is simplified.

Advantageously, two connecting stubs, which are arranged on the second side of the base plate, are arranged on respective pipe stubs. The two pipe stubs are connected to each other over at least a portion of their lengths. In this way, the geometry of the mold for manufacturing the connector piece is simplified. Narrow struts between the pipe stubs can be omitted. Advantageously, the hose connector is made of plastic and is manufactured in an injection-molding process.

For a handheld work apparatus with a hose connector, the hose connector is arranged in an opening of a tank of the work apparatus with the tank holding operating means. The tank can, for example, be a fuel tank or a lubricant tank. Also, other vessels can define a tank for operating means, for example, a spray medium container of a spray apparatus.

A first connecting channel of the hose connector on a first connecting stub is connected to a suction head arranged in the interior of the tank holding the operating means. If the tank is a fuel tank, then the first connecting channel on the outer side of the tank, that is, the fuel tank, is advantageously connected to a second connecting stub with a connecting line which is connected to a carburetor of the work apparatus. The fuel, which is taken up by the suction head, is supplied to the carburetor via the connecting line. A second connecting channel of the hose connector opens into the interior of the tank at the base plate. The second connecting channel thereby opens directly into the interior of the operating means tank. A connection to a hose line is not provided here. The second connecting channel is arranged on the outer side of the operating means tank, especially on the outer side of the fuel tank. Advantageously, this second connecting channel is connected at a third connecting stub to a return line which is connected to a carburetor of the work apparatus. The second connecting channel thereby functions to return fuel from the carburetor into the fuel tank while fuel from the fuel tank flows to the carburetor through the first connecting channel.

BRIEF DESCRIPTION OF THE DRAWINGS

The invention will now be described with reference to the drawings wherein:

FIGS. 3 and 4 show respective perspective views of the hose connector of FIG. 2;

FIG. 5 is a side elevation view of the hose connector of FIG. 2;

FIG. 6 is a side elevation view of the hose connector of FIG. 5 viewed in the direction of arrow VI in FIG. 5;

FIG. 7 is a side elevation view of the hose connector of FIG. 5 viewed in the direction of arrow VII in FIG. 5;

FIG. 8 is a plan view of the hose connector of FIG. 5 viewed in the direction of arrow VIII in FIG. 5;

DESCRIPTION OF THE PREFERRED
EMBODIMENTS OF THE INVENTION

Figure 1:
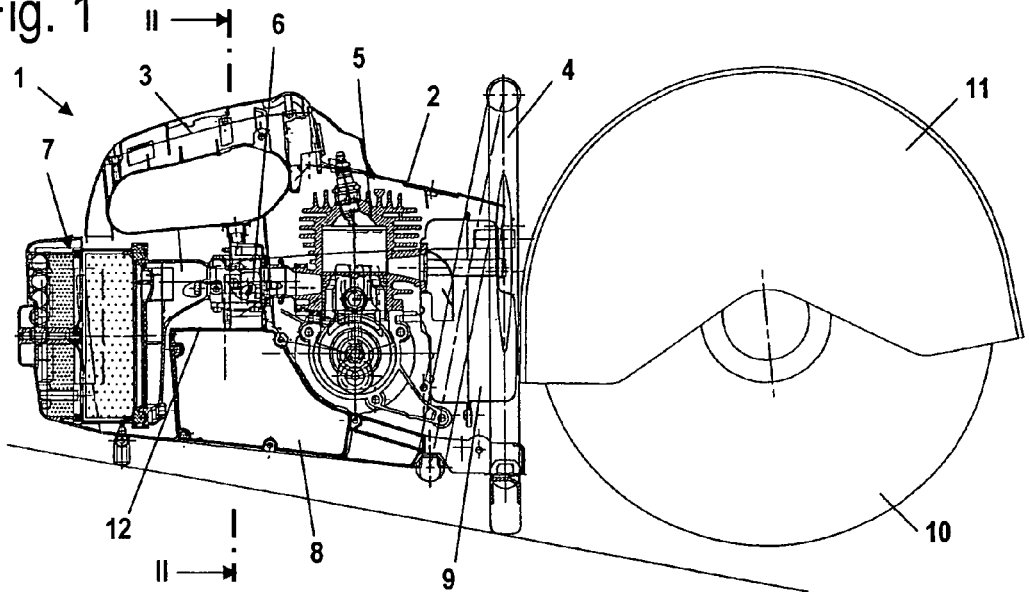
FIG. 1 is a schematic longitudinal section view through a handheld work apparatus.

In FIG. 1, a cutoff machine 1 is shown as an embodiment of a portable handheld work apparatus. However, other portable handheld work apparatus such as motor-driven chain saws, brushcutters or the like can also be used. The cutoff machine 1 has a housing 2 on which an upper handle 3 is mounted. The cutoff machine 1 includes a work tool in the form of a cutoff disc 10 which is covered by a guard 11 over a portion of its periphery. The cutoff disc 10 is rotatably driven by a drive motor 5 mounted in the housing 2. The drive motor 5 is configured as an internal combustion engine. In the embodiment, the drive motor 5 is a two-stroke engine. However, a mixture-lubricated four-stroke engine can also be used as a drive motor. A handle tube 4 extends over the housing 2 on the end facing toward the cutoff disc 10.

The drive motor 5 draws combustion air via an air filter 7. The combustion air flows through the air filter 7 and through a carburetor 6 and from there to the drive motor 5. Fuel is admixed to the combustion air in the carburetor 6. The fuel is drawn by suction from a fuel tank provided in the housing 2. The fuel tank 8 has an upper housing wall 12 facing toward the carburetor 6. An exhaust-gas muffler 9 is mounted in the housing 2 next to the cutoff disc 10. Exhaust gases flow via the exhaust-gas muffler 9 from the drive motor 5 into the ambient.

Figure 2:
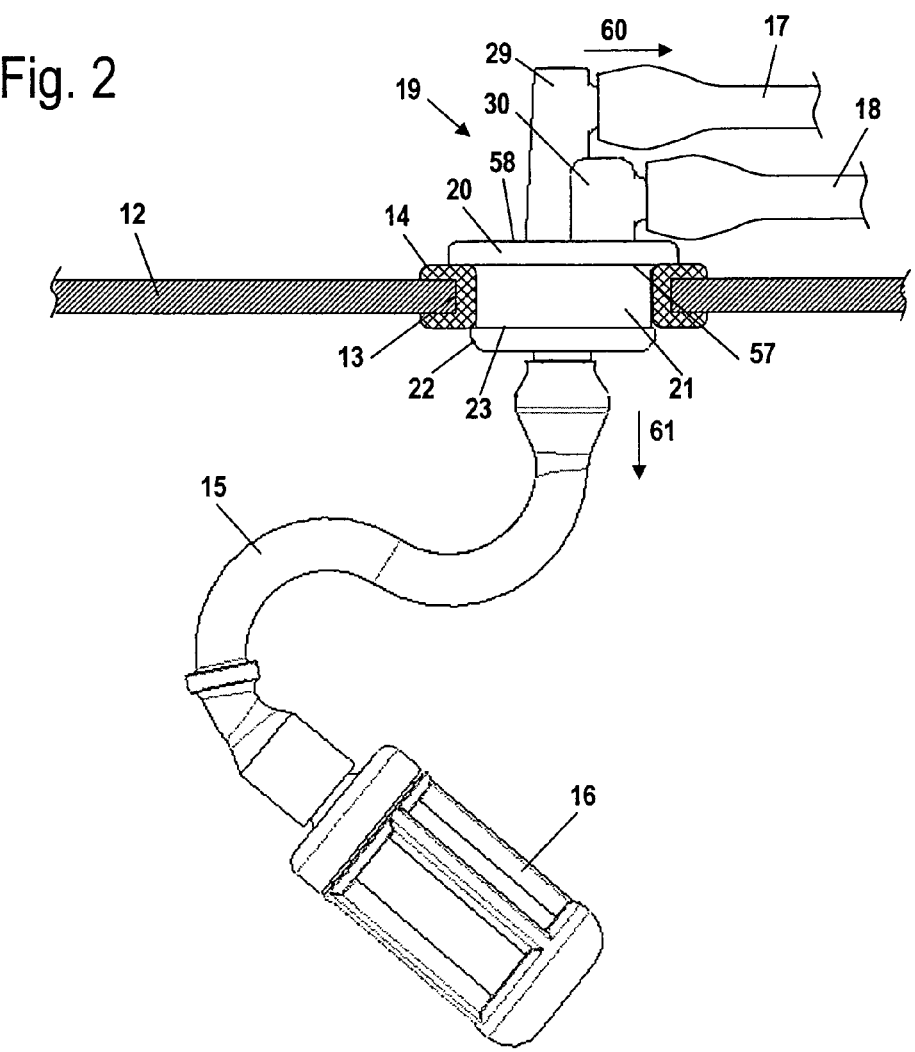
FIG. 2 is a schematic detail section view of a housing wall of the fuel tank of the work apparatus of FIG. 1 with a hose connector mounted therein.
Figure 9:
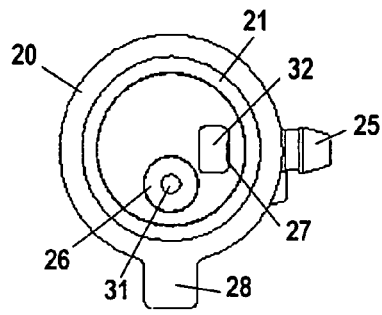
FIG. 9 is a view of the hose connector of FIG. 5 from below as viewed in the direction of arrow IX in FIG. 5.
Figure 10:
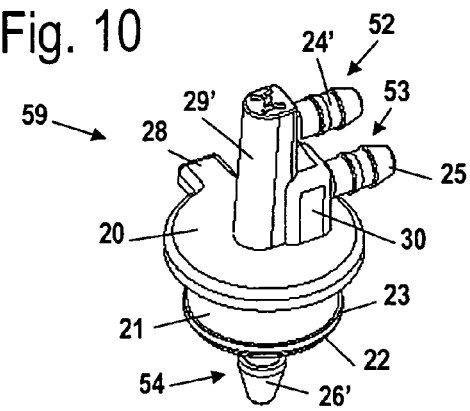
FIGS. 10 and 11 show respective perspective views of an embodiment of a hose connector.
Figure 11:
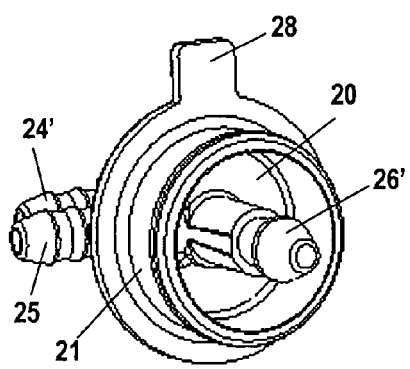
Figure 12:
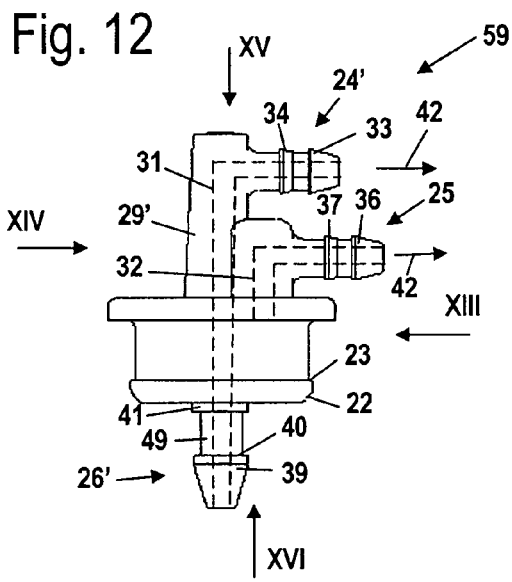
FIG. 12 is a side elevation view of the hose connector of FIGS. 10 and 11.

A hose connector 19 is mounted in the housing wall 12 of the fuel tank 8 to connect the fuel tank 8 to the carburetor 6. The hose connector 19 is shown in FIG. 2 and is disposed outside of the section plane shown in FIG. 1.

The hose connector 19 is mounted in an opening 13 of the housing wall 12. A seal 14 is provided in the opening 13 in which a sealing rim 21 of the hose connector 19 is disposed. The seal 14 establishes a seal-tight connection between the sealing rim 21 and the opening 13.

In the embodiment, the sealing rim 21 runs perpendicularly to the plane of the housing wall 12. The hose connector 19 has a base plate 20 on which the sealing rim 21 is fixed. The base plate 20 lies against the seal 14 at the outer side of the housing of the fuel tank 8. The base plate 20 extends outwardly beyond the sealing rim 21. The base plate 20 and the sealing rim 21 close off the opening 13 in the manner of a cover. The base plate 20 has a first side 57, which faces toward the interior of the fuel tank 8, and a second side 58 which faces outwardly. The sealing rim 21 is fixed on the first side 57. The sealing rim 21 is configured to be cylindrical in the region of the seal 14 and has a shoulder 23 on the end facing away from the base plate 20. The shoulder 23 lies against the seal 14 and a chamfer 22 extends therefrom at the side facing away from the base plate 20. The chamfer 22 facilitates the assembly of the connector piece 19 in the opening 13.

The hose connector 19 has a connecting stub (not shown in FIG. 2) on its side facing toward the interior of the fuel tank 8. A suction line 15 is connected to this connecting stub. The suction line 15 is connected to a suction head 16 arranged in the fuel tank 8. The suction line 15 can be pulled off from the connecting stub in a pull-off direction 61 which lies perpendicular to the plane of the base plate 20.

On the second side 58 of the base plate 20, two pipe stubs 29 and 30 are fixed which run approximately perpendicularly to the base plate 20. A connecting stub (not shown) protrudes from the pipe stub 29 and a connecting line 17 is pushed onto the connecting stub. The connecting line 17 is connected to the suction line 15 via the hose connector 19. The connecting line 17 is connected to a carburetor 6 (FIG. 1) at its end (not shown) facing away from the hose connector 19. The pipe stub 30 is provided with a connecting stub (not shown in FIG. 2) onto which a return line 18 is pushed. The return line 18 is likewise connected to the carburetor 6 and opens into the interior of the fuel tank 8 at the base plate 20. The connecting line 17 as well as the return line 18 can be pulled off from the corresponding connecting stubs in a pull-off direction 60.

FIGS. 3 to 9 show the configuration of the hose connector 19 in detail. As shown in FIGS. 3 and 4, a first connecting stub 26 is fixed in the interior of the rim 21 at the first side 57 of the base plate 20. The connecting stub 26 is fixed on the base plate 20 via a pipe stub 41. The first connecting stub 26 has a pull-off protector 54 which hinders an unintended pulling off of the suction line 15 from the first connecting stub 26.

A second connecting stub 24 is arranged on the pipe stub 29 fixed on the second side 58 of the base plate 20. The connecting stub 24 has a pull-off protector 52. The pull-off protector 52 hinders an unintended pulling off of the connecting line 17 from the connecting stub 24. The second connecting stub 24 projects laterally from the pipe stub 29. The pipe stub 29 is closed at its end facing away from the base plate 20. A third connecting stub 25 for the return line 18 is formed on the pipe stub 30. The third connecting stub 25 protrudes laterally from the pipe stub 30. The third connecting stub 25 has a pull-off protector 53. Pipe stub 30 is also configured to be closed at its end facing away from the base plate 20. As FIGS. 3 and 4 show, the base plate 20 is essentially configured as a circular disc. A lug 28 is formed on the circular disc forming the base plate 20 and extends outwardly and facilitates the disassembly of the hose connector 19 from the opening 13.

As shown in FIG. 5, the hose connector 19 has a first connecting channel 31 which connects the suction line 15 to the connecting line 17. The first connecting channel 31 projects through the first connecting stub 26, the pipe stub 41, the base plate 20, the pipe stub 29 as well as the second connecting stub 24. A second connecting channel 32 connects the return line 18 to the interior of the fuel tank 8 and projects through the base plate 20, the pipe stub 30 and the third connecting stub 25. As shown in FIG. 4, the second connecting channel 32 opens with its opening 27 at the first side 57 of the base plate 20 into the interior of the fuel tank 8.

FIG. 5 shows the configuration of the pull-off protectors 52, 53 and 54 (FIG. 4) in detail. All pull-off protectors (52, 53, 54) are configured to have a so-called pine tree structure. The pull-off protector 52 on the second connecting stub 24 includes a first thickening 33 and a second thickening 34. The second thickening 34 is disposed between the first thickening 33 and the pipe stub 29. The thickenings 33 and 34 have respective steps 35 at the side facing toward the pipe stub 29. The thickenings 33 and 34 are configured to have a truncated-cone shape. The diameters of the thickenings 33 and 34 increase in the direction toward the pipe stub 29, that is, in a direction opposite to the pull-off direction 60 shown in FIG. 2. In this way, the connecting line 17 can easily be pushed onto the connecting stub 24. An unwanted pull off of the connecting line 17 is prevented by the shoulders 35 which are form tightly grabbed from behind by the elastic connecting line 17. Respective narrow cylindrical sections are disposed between the truncated conically-shaped sections of the thickenings 33 and 34 and the shoulders 35. However, these narrow cylindrical sections can be omitted.

The configuration of the pull-off protector 53 of the third connecting stub 25 corresponds to that of the pull-off protector 52. The pull-off protector 53 includes two thickenings 36 and 37. The second thickening 37 is arranged between the first thickening 36 and the pipe stub 30. The thickenings 36 and 37 have respective shoulders 38 at the side facing toward the pipe stub 30. In the pull-off direction 60, a cylindrical section first extends from the shoulders 38 and thereafter extends into a truncated conically-shaped section. The diameter of the truncated conically-shaped section decreases in the pull-off direction 60 so that the return line 18 can be easily pushed onto the connecting stub 25 and a pull off is prevented by the shoulders 38.

The first connecting stub 26 has a section 49 of reduced diameter between the pipe stub 41 and the thickening 39 with this thickening 39 forming the pull-off protector 54. As shown in FIG. 5, the lower edge of the pipe stub 41 is at a distance (h) to the base plate 20. The lower edge of the pipe stub 41 is arranged within the sealing rim 21. The distance (h) is greater than the distance (f) of the lower edge 51 of the sealing rim 21 to the base plate 20 shown in FIG. 6. The thickening 39 has a truncated conically-shaped section having a diameter which increases in a direction toward the section 49 opposite to the pull-off direction 61. A narrow cylindrical section extends from the truncated conically-shaped section and a shoulder 40 is formed behind this cylindrical section. The shoulder 40 is grabbed from behind form tightly by the suction line 15.

As shown in FIG. 5, the pipe stubs (29, 30, 41) extend perpendicularly to the base plate 20. The pipe stub 41 is configured to be cylindrical while the pipe stubs 29 and 30 are slightly tapered. The connecting stubs 24 and 25 run at an angle to the pipe stubs 29 and 30 and parallel to the plane of the base plate 20. The connecting stub 24 has a longitudinal direction 55 and the connecting stub 25 has a longitudinal direction 56 which both run parallel to the base plate 20. The longitudinal directions 55 and 56 run parallel to each other. The connecting stubs 24 and 25 are advantageously configured to be rotationally symmetrical to the longitudinal directions 55 and 56, respectively. The connecting stub 26 runs perpendicular to the base plate 20 and as an extension of pipe stub 41.

The hose connector 19 is manufactured of plastic in an injection-molding process. This is possible because of the special configuration and arrangement of the connecting stubs 24, 25 and 26. In FIGS. 5 and 6, the pull directions of the core and mold halves are shown with which the hose connector 19 can be made. The sections of the connecting channels 31 and 32, which run in the connecting stubs 24 and 25, are produced with cores which are pulled in the pull direction 42 shown in FIG. 5. FIG. 6 shows the partitioning of the mold for the hose connector 19. The mold has a partition plane 46 which runs perpendicularly to the base plate 20 and which partitions the connecting stubs 24 and 25 in the middle. The partition plane 46 has a step 50 between the two connecting stubs 24 and 25 so that the partition plane 46 can partition both connecting stubs 24 and 25 in the middle. As shown in FIG. 8, the longitudinal directions 55 and 56 are at an offset (d) to each other in plan view on the connector 19, that is, parallel to the plane of the base plate 20. The offset (d) corresponds to the width of the step 50.

As shown in FIG. 6, the connecting stubs 24 and 25 are at a distance (a) to each other viewed in a direction perpendicular to the plane of the base plate 20. The step 50 is disposed in the region of the distance (a) between the two connecting stubs 24 and 25. The distance (a) ensures that both connecting stubs 24 and 25 can be demolded with the respective pull-off protectors 52 and 53. Because of the pull-off protectors 52 and 53, the demolding takes place perpendicularly to the longitudinal directions 55 and 56 and not in the pull direction 42 (FIG. 5). As FIG. 6 shows, the two mold halves of the hose connector 19 are demolded in opposite pull directions 43 and 44 which lie parallel to the plane of the base plate 20 and perpendicularly to the longitudinal direction of the pipe stubs 29 and 30 and the connecting stubs 24 and 25. In this way, a demolding is possible in a simple manner and without undercuts. As FIG. 3 shows, the two pipe stubs 29 and 30 are formed one on the other. This too avoids undercuts and makes possible a demolding of the hose connector 19. In this way, further cores can be avoided.

A further partition plane 47 is provided below the sealing rim 21 approximately at the elevation of the lower edge of the pipe stub 41. A core is provided in order to demold the region lying in the interior of the sealing rim 21. This core imparts the form of the cylindrical inner space of the sealing rim 21 with the sections of the connecting channels 31 and 32 which run perpendicularly to the base plate 20. The core furthermore imparts the form to the first connecting stub 26. The core is pulled in pull direction 45 perpendicularly to the base plate 20. In order to form the section 49 with reduced diameter, the core has additional lateral sliders which form the section 49 with a reduced diameter.

During the demolding of the hose connector 19, the sliders, which image the section 49, are pulled laterally outwardly along the pull directions 62 and 63. Thereafter, the core which imparts the form to the interior space of the sealing rim 21, is pulled downwardly in the pull direction 45. In order to permit a pulling of the core, the thickening 39 has a maximum diameter (c) which corresponds at most to the diameter (b) of the pipe stub 41. The section, which images or imparts the form to the pipe stub 41, can then be pulled over the thickening 39 and so be ejected. The thickening 39 and the section 49 are arranged below the edge of the pipe stub 41 so that the slider for the section 49 can be moved laterally outwardly. For this reason, a simple manufacture of the hose connector 19 is possible.

At the shoulder 40, the thickening 39 is at a distance (e) from the base plate 20 which is greater than the distance (f) of the lower edge 51 of the sealing rim 21 to the base plate 20. If the first connecting stub 26 has several thickenings as pull-off protectors, then all thickenings are advantageously arranged below the sealing rim 21, that is, at a distance (e) which is greater than the largest distance (f) of the lower edge 51 of the sealing rim 21 to the base plate 20.

Figure 13:
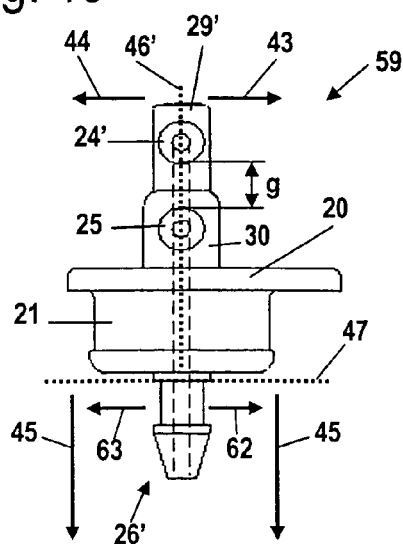
FIG. 13 is a side elevation view of the hose connector of FIG. 12 viewed in the direction of arrow XIII in FIG. 12.
Figure 14:
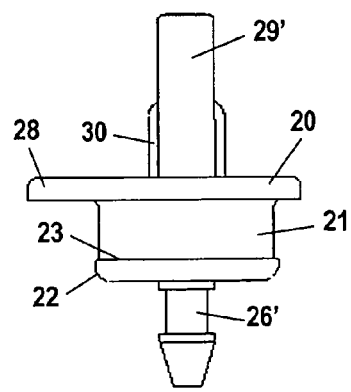
FIG. 14 is a side elevation view of the hose connector of FIG. 12 viewed in the direction of arrow XIV in FIG. 12.

FIGS. 10 to 16 show an embodiment of a hose connector 59 which corresponds essentially to the hose connector 19 shown in FIGS. 3 to 9. The same reference numerals identify the same elements. The hose connector 59 has a first connecting stub 26', a second connecting stub 24' as well as a third connecting stub 25. The connecting stubs 24' and 26' are offset relative to the connecting stubs 24 and 26 of hose connector 19 toward the center of the hose connector 59. As shown in FIG. 13, the connecting stubs 24' and 25 are arranged perpendicularly one above the other referred to the plane of the base plate 20. There is no offset of the two connecting stubs 24' and 25. The two connecting stubs 24' and 25 are at a distance (g) from each other which is measured perpendicularly to the plane of the base plate 20. The configuration of the pull-off protectors 52, 53 and 54 corresponds to those of hose connector 19.

Figure 16:
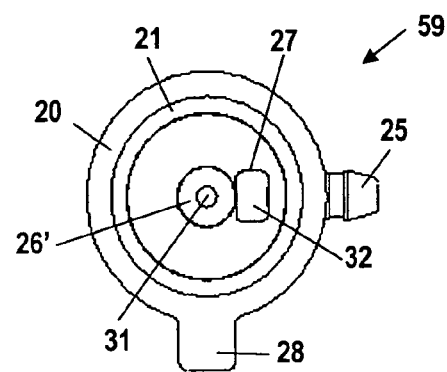

As shown in FIG. 16, the first connecting channel 31 opens approximately into the center in the interior of the fuel tank 8. The connecting stub 26' is arranged next to the opening 27 as viewed perpendicularly onto the base plate 20. In FIG. 13, the partition plane 46' of two mold halves for making the hose connector 59 is shown. The partition plane 46' runs perpendicularly to the plane of the base plate 20. A step is not provided. The partition plane 46' cuts the connecting stubs 24' and 25 at the center. The partition plane 47 is provided perpendicularly to the partition plane 46'. The demolding of the first connector stub 26' takes place corresponding to the demolding of the first connecting stub 26.

Figure 15:
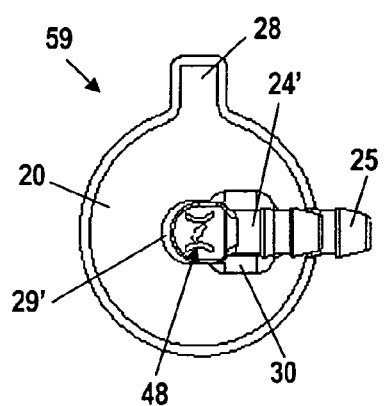
FIG. 15 is a plan view of the hose connector of FIG. 12 viewed in the direction of arrow XV in FIG. 12; and, FIG. 16 is a view of the hose connector of FIG. 12 from below viewed in the direction of arrow XVI in FIG. 12.

As FIGS. 8 and 15 show, the hose connectors 19 and 59 have a marking 48 which is arranged on the upper side of the pipe stubs (29, 29') and this identifies which hose line is to be fixed to the connecting stubs (24, 24').

It can be provided that several connecting stubs open on a pipe stub.

The arrangement of the two pipe stubs on the second side of the base plate at a distance to each other, which is measured perpendicularly to the base plate, defines an independent inventive concept which ensures a demolding of the hose connector when manufacturing in an injection-molding process also for hose connectors for which no pull-off protectors are provided, which are fixed within the sealing rim, or wherein no connecting stub is provided fixed within a sealing rim.

It is understood that the foregoing description is that of the preferred embodiments of the invention and that various changes and modifications may be made thereto without departing from the spirit and scope of the invention as defined in the appended claims.

What is claimed is:

1. A hose connector for assembly in an opening of a housing, the hose connector comprising:

said hose connector being configured as a single piece and having a base plate;

said base plate defining a plane and having first and second sides;

a sealing rim disposed on said first side to accommodate mounting said hose connector in said opening;

a connecting channel passing through said base plate and having an end defining a first connecting stub for connecting to a hose line;

said first connecting stub being fixed on said base plate within said sealing rim;

said first connecting stub having a pull-off protector formed thereon for said hose line;

said pull-off protector being at a first distance (e) to said plane of said base plate measured perpendicularly to said plane;

said sealing rim having a lower edge disposed at a second distance (f) from said base plate;

said first distance (e) being greater than said second distance (f);

said first connecting stub including a pipe stub disposed on said base plate and arranged at least partially within said sealing rim;

a section of reduced diameter disposed between said pipe stub and said pull-off protector;

said pull-off protector defining a longitudinal axis along which said pull-off protector has a largest diameter (c)

which is larger than any other diameter of said pull-off protector along said longitudinal axis; and, said pipe stub having a diameter (b) being at least as large as said largest diameter (c) of said pull-off protector.

2. The hose connector of claim 1, wherein said second side of said base plate faces away from said sealing rim; wherein said hose connector further comprises a second connecting stub disposed on said second side of said base plate; and, said second connecting stub has a pull-off protector.

3. The hose connector of claim 1, wherein said hose line is pushed onto said first connecting stub and has a pull-off direction; said pull-off protector has a thickening having an end facing away from said pull-off direction; and, said thickening has a shoulder disposed at said end of said thickening.

4. The hose connector of claim 3, wherein said thickening has a section wherein said other diameter of said pull-off protector increases in a direction toward said shoulder.

5. The hose connector of claim 1, further comprising second and third connecting stubs arranged on said second side of said base plate.

6. The hose connector of claim 5, wherein said second and third connecting stubs are at a distance (a, g) from each other measured in a direction perpendicular to said base plate.

7. The hose connector of claim 5, further comprising a pipe stub fixed on said second side of said base plate and one of said second and third connecting stubs being mounted on said pipe stub; and, said one connecting stub being arranged on said pipe stub so as to project laterally therefrom.

8. The hose connector of claim 5, wherein at least one of said second and third connecting stubs is disposed parallel to said base plate.

9. The hose connector of claim 5, wherein said second and third connecting stubs extend parallel to said base plate.

10. The hose connector of claim 5, wherein said second and third connecting stubs are parallel to said plane of said base plate and are at an offset (d) to each other.

11. The hose connector of claim 5, further comprising two pipe stubs arranged on said second side of said base plate; and, said second and third connecting stubs being mounted on corresponding ones of said two pipe stubs; and, said two pipe stubs being connected to each other over at least a portion of their lengths.

12. The hose connector of claim 1, wherein said connector piece is made of plastic and is manufactured in an injection-molding process.

13. A hose connector for assembly in an opening of a housing, the hose connector comprising:

said hose connector being configured as a single piece and having a base plate;

said base plate defining a plane and having first and second sides;

a sealing rim disposed on said first side to accommodate mounting said hose connector in said opening;

a connecting channel passing through said base plate and having an end defining a first connecting stub for connecting to a hose line;

said first connecting stub being fixed on said base plate within said sealing rim;

said first connecting stub having a pull-off protector formed thereon for said hose line;

said pull-off protector being at a first distance (e) to said plane of said base plate measured perpendicularly to said plane;

said sealing rim having a lower edge disposed at a second distance (f) from said base plate;

said first distance (e) being greater than said second distance (f);

said first connecting stub including a pipe stub disposed on said base plate and arranged at least partially within said sealing rim;

said first connecting stub further including a section between said pipe stub and said pull-off protector;

said section having a reduced diameter;

said pipe stub having a lower edge facing away from said base plate and said lower edge being at a third distance (h) from said base plate; and, said third distance (h) being greater than said second distance (f).

14. The hose connector of claim 13, wherein said pull-off protector defines a longitudinal axis along which said pull-off protector has a largest diameter which is larger than any other diameter of said pull-off protector along said longitudinal axis; and, said reduced diameter of said section is less than the diameter of said pipe stub and less than said largest diameter of said pull-off protector.

* * * * *